W. MACDONALD.
NUT LOCK.
APPLICATION FILED MAR. 26, 1914.
1,148,848.                                      Patented Aug. 3, 1915.
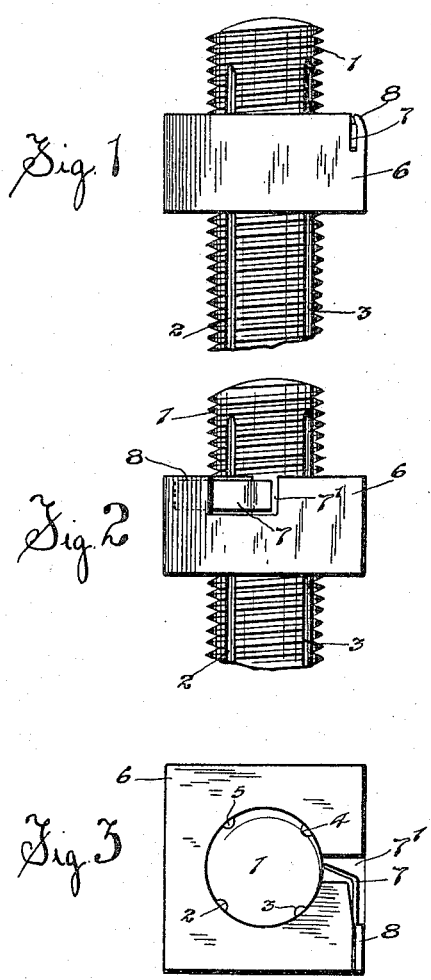
WITNESSES                                       INVENTOR
                                                W. Macdonald
                            By
                                                                    Attorney.

UNITED STATES PATENT OFFICE.

WILLIAM MACDONALD, OF SANDFORD DENE, SASKATCHEWAN, CANADA.

NUT-LOCK.

1,148,848.      Specification of Letters Patent.      Patented Aug. 3, 1915.

Application filed March 26, 1914. Serial No. 827,489.

*To all whom it may concern:*

Be it known that I, WILLIAM MACDONALD, of the post-office of Sandford Dene, in the Province of Saskatchewan, Canada, have invented certain new and useful Improvements in Nut-Locks, of which the following is the specification.

The invention relates to improvements in nut locks and the object of the invention is to provide an inexpensive efficient nut lock which is constructed so that the nut can be readily screwed down on the bolt but will lock when unscrewed and thereby prevent the removal of the nut from the bolt.

With the above object in view the invention consists essentially in a bolt having longitudinally directed grooves in the periphery thereof, a nut threaded on the bolt and a spring catch carried by the nut and designed to pass into the grooves in the turning of the nut on the bolt, the parts being arranged and constructed as hereinafter more particularly described and later pointed out in the appended claim.

Figure 1 represents a side view of my invention. Fig. 2 represents a side view of the nut lock in a position turned a quarter turn from the position shown in Fig. 1. Fig. 3 represents a plan view.

In the drawing like characters of reference indicate corresponding parts in each figure.

1 represents a screw threaded bolt provided in the present instance with four longitudinally directed channels 2, 3, 4 and 5, these being cut approximately a depth equal to the thread of the bolt.

6 represents a nut screw threaded on the bolt in the usual way.

7 represents a spring catch carried by the nut, the catch being contained in a more or less L-shaped slot 7′ formed in the nut and having the outer end thereof fastened permanently to the body of the nut in any suitable way and the inner end bearing on the threads of the bolt. In the present instance the catch has been secured to the nut by cutting the nut to receive the outer end of the catch and by turning and jamming the upper end of the lip 8 so provided over the body of the catch.

With this form of lock it will be seen that as the nut is turned in a right hand direction on the bolt the catch will ride over the threads and into and out of the grooves. However if one attempts to unscrew the nut the catch will spring into the presented grooves and prevent the further movement of the nut.

It will be seen that if it is desired to unscrew the nut one has simply to spring back the catch and hold it away from the threads. The catch can be readily approached from the top of the nut as the slot is open from the top.

What I claim as my invention is:

The combination with a bolt provided with a longitudinal groove passing across the threads thereof, of a nut threaded onto said bolt, an L shaped slot formed in said nut, a lip formed by said slot, a spring catch contained within said slot, said lip being jammed upon one end of the body of the catch, the other end thereof being adapted to trip into and escape from said groove in the screwing down of the nut and to pass into and remain in said groove in an attempt to unscrew the nut as and for the purpose described.

Signed at Winnipeg, this 10th day of March, 1914.

WILLIAM MACDONALD.

In the presence of—
  G. S. ROXBURGH,
  L. GOULD.

Copies of this patent may be obtained for five cents each, by addressing the "Commissioner of Patents, Washington, D. C."